(12) United States Patent
Schlegel et al.

(10) Patent No.: US 11,169,804 B2
(45) Date of Patent: Nov. 9, 2021

(54) METHOD FOR VECTORIZING D-HEAPS USING HORIZONTAL AGGREGATION SIMD INSTRUCTIONS

(71) Applicant: Oracle International Corporation, Redwood Shores, CA (US)

(72) Inventors: Benjamin Schlegel, Merced, CA (US); Harshad Kasture, Redwood Shores, CA (US); Pit Fender, Union City, CA (US); Matthias Brantner, Sunnyvale, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 247 days.

(21) Appl. No.: 16/139,226

(22) Filed: Sep. 24, 2018

(65) Prior Publication Data
US 2020/0097288 A1    Mar. 26, 2020

(51) Int. Cl.
| G06F 9/30 | (2018.01) |
| G06F 9/38 | (2018.01) |
| G06F 12/02 | (2006.01) |
| G06F 16/901 | (2019.01) |

(Continued)

(52) U.S. Cl.
CPC ...... *G06F 9/30036* (2013.01); *G06F 9/30021* (2013.01); *G06F 9/3887* (2013.01); *G06F 12/023* (2013.01); *G06F 16/2246* (2019.01); *G06F 16/9027* (2019.01); *G06F 7/24* (2013.01)

(58) Field of Classification Search
CPC ............. G06F 9/30036; G06F 9/30021; G06F 9/3887; G06F 7/24; G06F 12/023; G06F 16/2246; G06F 16/9027
See application file for complete search history.

(56) References Cited

U.S. PATENT DOCUMENTS

| 5,287,494 A | 2/1994 | Garcia |
| 5,850,538 A | 12/1998 | Steinman |

(Continued)

FOREIGN PATENT DOCUMENTS

| WO | WO 03/107222 A1 | 12/2003 |
| WO | WO 2008/091705 A2 | 7/2008 |
| WO | WO 2015/069941 A1 | 5/2015 |

OTHER PUBLICATIONS

Khuong et al., Heapsort: More Comparisons, Less Memory Traffic. dated Apr. 2014, 34 pages.

(Continued)

*Primary Examiner* — Matthew J Ellis
(74) *Attorney, Agent, or Firm* — Hickman Becker Bingham Ledesma LLP (57) ABSTRACT

Techniques for maintaining d-heap property and speeding up retrieval operations, such as top or pop, by vectorizing the d-heap and utilizing horizontal aggregation SIMD instructions across the retrieval operations. A d-heap is vectorized by storing it in a contiguous memory array containing a beginning-most side and end-most side. Horizontal aggregation SIMD instructions are utilized to aggregate the values of the vectorized d-heap. Thus, the number of comparisons required in order to find the maximum or minimum key value within a single node of the d-heap is reduced resulting in faster retrieval operations.

20 Claims, 6 Drawing Sheets

(51) Int. Cl.
G06F 7/24 (2006.01)
G06F 16/22 (2019.01)

(56) References Cited

U.S. PATENT DOCUMENTS

| | | | | |
|---|---|---|---|---|
| 6,259,988 | B1* | 7/2001 | Galkowski | G01C 21/00 |
| | | | | 340/989 |
| 6,952,696 | B1* | 10/2005 | Nadj | G06F 7/22 |
| 8,387,057 | B2 | 2/2013 | Wilmarth | |
| 9,275,110 | B2 | 3/2016 | Pradhan | |
| 2007/0233766 | A1* | 10/2007 | Gschwind | G06F 9/30174 |
| | | | | 708/490 |
| 2008/0189303 | A1 | 8/2008 | Bush et al. | |
| 2011/0219204 | A1* | 9/2011 | Caspole | G06F 12/0253 |
| | | | | 711/173 |
| 2012/0001108 | A1 | 1/2012 | Bensberg et al. | |
| 2012/0222005 | A1* | 8/2012 | Harris | G06F 3/0673 |
| | | | | 717/120 |
| 2015/0178375 | A1* | 6/2015 | Ishizaki | G06F 16/285 |
| | | | | 707/737 |
| 2015/0309846 | A1* | 10/2015 | Prasad | G06F 9/522 |
| | | | | 345/522 |
| 2015/3098446 | | 10/2015 | Prasad | |
| 2016/0275078 | A1 | 9/2016 | Arraluri et al. | |
| 2017/0017683 | A1 | 1/2017 | Fourny et al. | |
| 2017/0060973 | A1 | 3/2017 | Liu et al. | |
| 2017/0255676 | A1 | 9/2017 | Attaluri | |
| 2018/0004809 | A1 | 1/2018 | Ramesh et al. | |
| 2018/0211046 | A1 | 7/2018 | Muttik | |
| 2020/0210398 | A1 | 7/2020 | Liu et al. | |
| 2020/0293332 | A1 | 9/2020 | Schlegel | |
| 2021/0232402 | A1 | 7/2021 | Schlegel | |

OTHER PUBLICATIONS

Bramas. "Fast Sorting Algorithms Using AVX-512 on Intel Knights Landing" CoRR, abs/1704.08579, 2017a. URL http://arxiv.org/abs/1704.08579, dated 2017, 17 pages.
Chasseur et al., "Enabling JSON Document Stores in Relational Systems", WebDB dated 2013, New York, New York, USA, 16 pages.
E. Knuth. The Art of Computer Programming, vol. 3: (2Nd Ed.) Sorting and Searching. AddisonWesley Longman Publishing Co., Inc., Redwood City, CA, USA, 1998. ISBN 0-201-89685-0.
Fadel et al., ". Heaps and Heapsort on Secondary Storage", Theor. Comput. Sci., 220(2):345-362, dated Jun. 1999. ISSN 0304-3975, 18 pages.
Gedik et al., Cellsort: High Performance Sorting on the Cell Processor, In Proceedings of the 33rd International Conference on Very Large Data Bases, VLDB '07, VLDB Endowment, 2007, 12 pages.
H. Inoue and K. Taura. "Simd- and Cache-friendly Algorithm for Sorting an Array of Structures", Proc. VLDB Endow., dated Jul. 2015. ISSN 2150-8097, 12 pages.
Bramas. "A Novel Hybrid Quicksort Algorithm Vectorized Using AVX-512 on Intel Skylake", International Journal of Advanced Computer Science and Applications (IJACSA), Nov. 2017, 9 pages.
J. Chhugani et al., ". Efficient implementation of Sorting on Multi-Core Simd Cpu Architecture", Proc. VLDB Endow., 1(2):1313{1324, datged Aug. 2008. ISSN 2150-8097, 12 pages.
Xiaochen et al, "Register Level Sort Algorithm on Multi-core Simd Processors", In Proceedings of the 3rd Workshop on Irregular Applications: Architectures and Algorithms, IA3, dated 2013, 8 pages.
Kleppmann et al., "A Conflict-Free Replicated JSON Datatype", dated Aug. 15, 2017, 17 pages.
Li et al., "Closing the functional and Performance Gap between SQL and NoSQL", ACM 978-1-4503-3531-7, dated Jun. 26, 2016, 12 pages.

Oracle Database, "Introduction to Simple Oracle Document Access (SODA)", 18c E86033-04, dated Aug. 2018, 96 pages.
Satish et al., Fast Sort on Cpus, Gpus and Intel Mic Architectures, Intel, 11 pages.
Shukla et al., "Schema-Agnostic Indexing with Azure DocumentDB", Proceedings of the VLDB Endowment, vol. 8, No. 12, Copyright 2015 VLDB, 12 pages.
Wegner et al., "The External Heapsort". IEEE Trans. Softw. Eng., dated Jul. 1989. ISSN 0098-5589, 9 pages.
Harada and L. Howes. Introduction to gpu radix sort. Dated 2011, 3 pages.
Idicula, U.S. Appl. No. 15/882,108, filed Jan. 29, 2018, Office Action dated Dec. 28, 2018.
Balkesen, U.S. Appl. No. 15/944,473, filed Apr. 3, 2018, Office Action dated Jan. 27, 2020.
Schlegel, U.S. Appl. No. 16/299,483, filed Mar. 12, 2019, Office Action dated Jun. 22, 2020.
Balkesen, U.S. Appl. No. 15/944,473, filed Apr. 3, 2018, Notice of Allowance dated May 27, 2020.
Xu et al., "A Flight Data Recorder for Enabling Full-system Multiprocessor Deterministic Replay", 30th Annual International Symposium on Computer Architecture San Diego, CA, Jun. 2003, 12 pgs.
Staats et al., "Parallel Symbolic Execution for Structural Test Generation", ISSTA'10, Jul. 12-16, 2010, Trento, Italy, 11 pages.
Sorin, "SafetyNet: Improving the Availability of Shared Memory Multiprocessors with Global Checkpoint/Recovery", dated May 2002, 14 pages.
Sheehy, Justin, "Why Vector Clocks Are Hard", Basho Blog, dated Apr. 5, 2010, 14 pages.
Roy et al., "Hybrid Binary Rewriting for Memory Access Instrumentation", VEE'11, Mar. 9-11, 2011, Newport Beach, California, USA, 12 pages.
Luk, et al., "Pin: Building Customized Program Analysis Tools with Dynamic Instrumentation", PLDI'05 Jun. 12-15, 2005,Chicago,Illinois,USA, 11 pages.
LeGendre, Matthew, "Dyninst as a Binary Rewriter", dated Apr. 2008, 23 pages.
Graham, "gprof: a Call Graph Execution Profiler" dated 1982, 10 pages.
Bach et al., "Analyzing Parallel Programs with Pin", Computer, Published by the IEEE Computer Society, dated 2010, 8 pages.
"Linux/UNIX System Programming Training", dated Aug. 14, 2107, 12 pages, http://man7.org/linux/man-pages/man1/gcov.1.html.
Liu et al., "ad-heap: an Efficient Heap Data Structure for Asymmetric Multicore Processors", In Proceedings of Workshop on General Purpose Processing Using GPUs, ACM, dated 2014, 10 pages.
LaMarca et al., "The Influence of Caches on the Performance of Heaps", dated Jan. 1, 1996, 26 pages.
Furtak et al., "Using SIMD Registers and Instructions to Enable Instruction-Level Parallelism in Sorting Algorithms", ACM Symposium on Parallel Algorithms and Architectures, dated 2007, 10 pages.
D.E. Knuth, "The Art of Computer Programming", vol. 3: 2nd Edition Sorting and Searching, ISBN: 0-201-03803-X, pp. 129-157 from book, dated 1973.
C. Balkesen et al.. "Main-memory hash joins on multi-core CPUs: Tuning to the underlying hardware," 2013 IEEE 29th International Conference on Data Engineering, pp. 362-373.
Begley et al. "MCJoin: A Memory-constrained Join for Column-Store Main-memory Databases", dated 2012, ACM SIGMOD International Conference on Management of Data (SIGMOD '12), pp. 121-132.
Zhou et al., "Implementing Database Operations Using SIMD Instructions", Proceedings of the ACM Sigmod International Conference on Management of Data, dated Jun. 3, 2002, pp. 145-156.
McHugh et al., "Lore: A Database Management System for Semistructured Data", SIGMOD, vol. 26 No. 3, dated Sep. 3, 1997, 14 pages.

(56) References Cited

OTHER PUBLICATIONS

Liu et al., "Ad-Heap", General Purpose Processing Using GPUS, ACM, 2 Penn Plaza 701 New Yorkm NY, USA, dated Mar. 1, 2014, pp. 54-63.
Balkesen, U.S. Appl. No. 15/852,038, filed Dec. 22, 2017, Notice of Allowance dated Nov. 5, 2019.
Tridgell et al., "A General-Purpose Paralll Sorting Algorithm", Computer Sciences Laboratory Australian National University, dated 1993, 24 pages.
Hunt et al., "An Efficient Algorithm for Concurrent Priority Queue Heaps", dated 1996, 7 pages.
Futak et al., "Using SIMD Registers and Instructions to Enable Instruction-level Parallelism in Sorting Algorithms", Annual Acm Symposium on Paralleslism in Algorithms and Architectures dated 2007, 10 pages.
Deo et al., "Parallel Heap: An optimal Parallel Priority Queue", dated 1992, 12 pages.
Schlegel, U.S. Appl. No. 16/299,483, filed Mar. 12, 2019, Notice of Allowance, dated Feb. 18, 2021.

\* cited by examiner

METHOD FOR VECTORIZING D-HEAPS USING HORIZONTAL AGGREGATION SIMD INSTRUCTIONS

FIELD OF THE INVENTION

The present disclosure relates to maintaining data structures and, more particularly, aggregation, storing, and removal of data in data structures.

BACKGROUND

A heap is a priority queue data structure containing nodes that have two child nodes holding a single value generally reflected via a tree structure. The key features of this data structure are the adding/removing of a single element in logarithmic time and the ability to find the smallest/largest element of its indexed elements in constant time. The most common types of heaps are min-heaps, which always return the smallest indexed element in the heap, and max-heaps, which always return the largest indexed element in the heap.

Many heaps are so large that a significant fraction of the runtime of the algorithm using the heap (e.g. graph algorithms) is spent on heap operations. Hence, there is a need for efficient heap implementations.

The d-heap is a generalization of a binary heap that has as many child nodes as defined by the value of d which contain an amount of values defined by the value of d. D-heaps use a tree to index its elements. D-heaps are the optimal data structure for fast insert operations since the additional child nodes decrease the depth of the underlying tree and result in fewer comparisons needed to restore the heap property when a new value is inserted into the heap.

However, retrieval operations in a d-heap such as top and pop require additional comparisons in order to find the maximum or minimum key value within a single node. Not only is the runtime of these comparisons high, but also additional computing resources are required resulting in a greater expense for the comparisons to be carried out compared to that of a regular binary heap.

Thus, techniques are desired to maintain the d-heap property and alleviate the costs and time associated with the additional comparisons needed for maintenance and retrieval operations of d-heaps.

Discussed herein are approaches for efficiently maintaining the d-heap property, speeding up the retrieval operations for d-heaps by vectorizing the d-heap, and utilizing horizontal aggregation SIMD instructions across the d-heap retrieval functions.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3A-B is a flow chart that depicts a process for performing a pop operation on a d-heap.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for maintaining d-heap property and speeding up retrieval operations, such as top or pop, by vectorizing the d-heap and utilizing horizontal aggregation SIMD instructions across the retrieval operations. As described herein, a memory is contiguous (within an address space) and contains an array of slots that form a beginning-most space and an end-most space in the array. A d-heap contains a plurality of nodes comprising D slots wherein each of the D slots store a key value of D key values, where each slot is an element of the array. The plurality of nodes include a root node and a plurality of parent nodes each containing D child nodes, and each child node being a child of a respective parent slot in each parent node and storing a key value greater than a key value stored in the respective parent slot.

In one embodiment, the plurality of nodes of the heap comprises multiple levels including a root level and non-root levels. The array of slots in a memory store the nodes of the d-heap across the D slots wherein the root-level is stored in the D slot at the beginning-most D slot of the array and the non-root levels are stored contiguously across the D slots to the end-most D slot of the array. As a result, the d-heap is vectorized allowing the key values within the nodes to be stored contiguously in the array. From here, the vectorized d-heap employs horizontal aggregation SIMD instructions to minimize the number of comparisons needed for retrieval operations.

In an embodiment, the heap is represented in the form of a complete binary tree in which all levels of the tree are completely filled with nodes, and in the case that the last level of the tree is not filled then the nodes of the last level fill the beginning most side of the tree. In another embodiment, the heap is represented in a pointer-based tree or an implicit data structure without any pointer where the root node is stored in the first position of an array of memory, the child nodes of the root node are stored in the second and third position of the array of memory, and the nodes of each subsequent level are stored within the array of memory directly behind the parent nodes that form the level above them.

In an embodiment, an implicit binary heap is configured to be stored in an array in a memory where all of the key values are stored in the array and the position of a key value within the heap is used to calculate the position of the node containing the key value along with the position of the node's parent and children nodes. The first position of the array represents the root node, the second and third position of the array represents the root node's children, and so forth.

D-Heap Overview

As described herein, a d-heap is a priority queue data structure containing an array of items that may be viewed as the nodes in a complete d-ary tree. As opposed to binary heaps, d-heaps typically run faster for heap sizes that exceed the size of the computer's cache memory because they result in less cache misses and virtual memory page faults than binary heaps.

D-heaps are implemented via any programming language that utilizes container data structures including JAVA, C++, OBJECTIVE-C or any other suitable programming environment.

As described herein, a d-heap is a priority queue data structure which contains a plurality of nodes in a tree structure wherein each node contains d values and has up to d successors/children. The plurality of nodes includes parent nodes and children nodes containing D slots wherein each of the D slots store a key value of D.

In one embodiment, the d-heap is contiguously stored in a memory array having slot elements containing a beginning-most space and end-most space. The plurality of nodes of the d-heap comprise D slots, D being a whole number greater than one, wherein each of the D slots store a key value, wherein the D slots are stored contiguously within a memory address space of the memory. Each parent node has D child nodes, and each child node is a child of a respective parent slot that stores a key value greater than any key value stored in the respective parent slot. A pop operation is performed on the d-heap by performing a SIMD operation on the root node to generate a first minimum key value and a first index of the first slot in the root node, which is a parent slot of a child slot, that holds the first minimum key value. The end-most value in the d-heap is copied into the first slot in the root node and a SIMD operation is performed on a child node of the root node to generate a second minimum key value and a second index in a slot of the child node that contains the second minimum key value. If the second minimum key value is less than the first minimum key value then the key values are swapped.

In one embodiment, a heap comprising a root level of nodes and one or more non-root level of nodes is stored in the memory array. Each element of the array holds a node of the d-heap wherein the root node is stored in the beginning-most element of the array and the non-root levels are contiguously stored immediately after the root node in respective contiguous array elements. The D slots of the root-node are stored in the beginning-most space of the array and each D-slot of the non-root levels is stored contiguously in elements of the array immediately after D-slots of the root node are stored.

In one embodiment, a heap is stored in an array in a memory that comprises a plurality of heap levels, which, after the first heap level, stores contiguously with an address space of the memory for each particular heap level all child nodes of each previous heap level. As described herein, heap levels are a mechanism to organize elements of a heap and are defined by their distance from the root node. The root node forms heap level 0 where it is the only node, the children of the root node form heap level 1, and each subsequent level contains the child nodes of each respective parent node.

Figure 1:
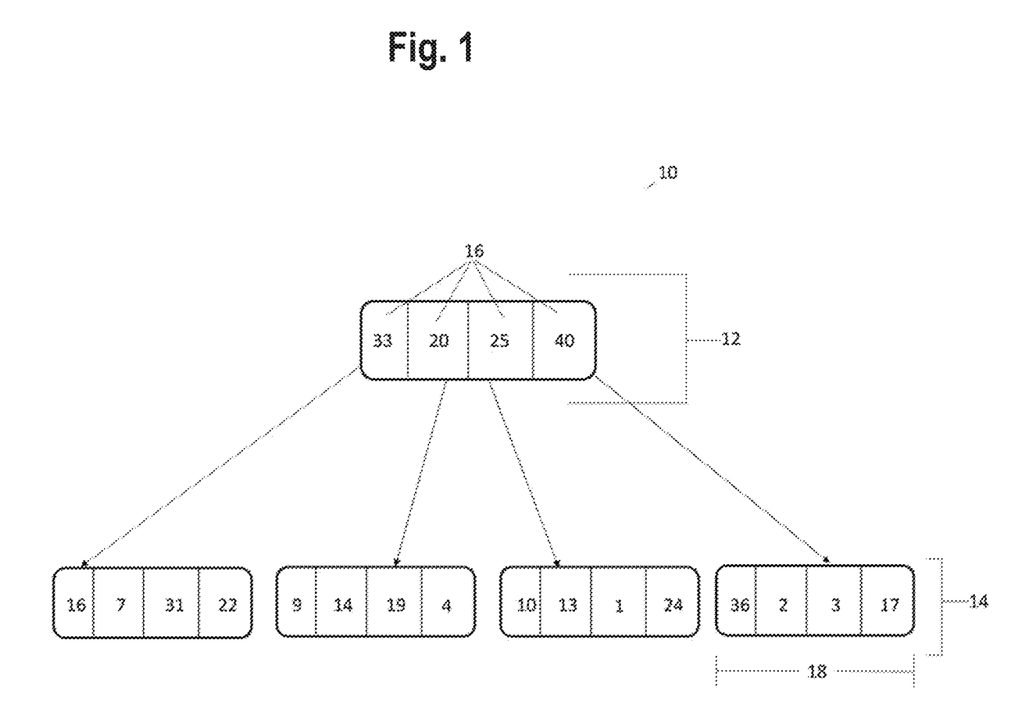
FIG. 1 is a diagram depicting a d-heap according to an embodiment of the present invention.

For the purpose of illustration a clear example, FIG. 1 illustrates d-heap 10 containing only 2 heap levels: a root level 12 and a non-root level 14. Other embodiments may implement any number of heap levels containing D child nodes comprising D slots in each heap level except for the first heap level containing the root node.

SIMD Overview

Single Instruction, Multiple Data (SIMD) architectures exist to allow computers with multiple processing elements to simultaneously perform the same operation on multiple data points. SIMD architectures may perform mainly "vertical" operations where corresponding elements in separate operands are operated upon in parallel and independently.

Unlike traditional vertical SIMD instructions, horizontal SIMD instructions are performed across the elements of a SIMD register. Horizontal aggregation SIMD instructions possess a subclass of horizontal aggregation SIMD instructions that aggregate the values of a single vector allowing the maximum and minimum key value in a register to be located.

SIMD instructions allow the execution alignment of the same operation on multiple data elements at once. In one embodiment, the key values stored in the D-slots of the heap are vectorized and aligned so that horizontal SIMD instructions are applied on the plurality of nodes in order to perform retrieval operations to find the minimum and maximum value within a node of the heap.

Vectorizing d-Reaps Using Horizontal Aggregation SIMD Instructions

In the d-heap being contiguously stored across the array of slots of the memory, the key values stored in the D slots of the nodes are contiguously in memory and control dependencies can be minimized for the many comparisons needed for the retrieval operations on the d-heap, thus increasing the speed of the operations.

Modern microprocessors and computer architectures, such as SSE4.1, are configured to execute media instructions that include identifying a horizontal minimum set of digital values and its corresponding location in a register. For example, the PHMINPOSUW instruction uses an array of 16-bit magnitude comparators to aggregate values into a vector using a minimum function, and finds the value and position of the smallest vector value. The instruction further sets the bottom unsigned 16-bit value of the destination to the smallest unsigned 16-bit value in the source, and the next-from-bottom to the index of that word in the source. Such instruction was introduced as part of Intel SSE4.1 and is available in all modern x86 processors.

Although PHMINPOSUW is currently the only horizontal aggregation SIMD instruction, min-heaps and max heaps for various data types can still be obtained despite this current limitation.

An improvement caused by the approach of using Horizontal Aggregation SIMD instructions on d-heap retrieval operations includes less cache lines needed to be retrieved to read a single element from a d-heap, more efficient memory management strategy for growing and shrinking of vectorized d d-heaps, and less comparisons performed in order to find the maximum or minimum key value within a single node of a d-heap.

D-Heap Implementation Overview

FIG. 1 is a diagram depicting an example d-heap 10, where the value of D is four, in an embodiment. D-heap 10 includes a plurality of nodes in a tree structure including a plurality of parent nodes at root level 12 and a plurality of children nodes at root level 14. Each node contains D slots and a plurality of key values 16 where each D slot stores D key values. Parent nodes in root level 12 contain a root node and each parent node has one or more child nodes being a child of a respective parent slot. While only two levels 12-14 are depicted, d-heap 10 may support many more non-root levels. Also, while FIG. 1 depicts plurality of key fields 16 containing integers, d-heap 10 supports various primitive types of data including but not limited to signed integers, unsigned integers, single-precision floating point, etc. In the case of unsigned integers, the signed bit is switched whenever a key value is inserted/pushed into a signed integer vectorized heap and the signed bit is switched back when it is retrieved from the heap. As a result, negative key values are returned before positive key values yielding the correct result of unsigned comparison instructions.

Figure 2:
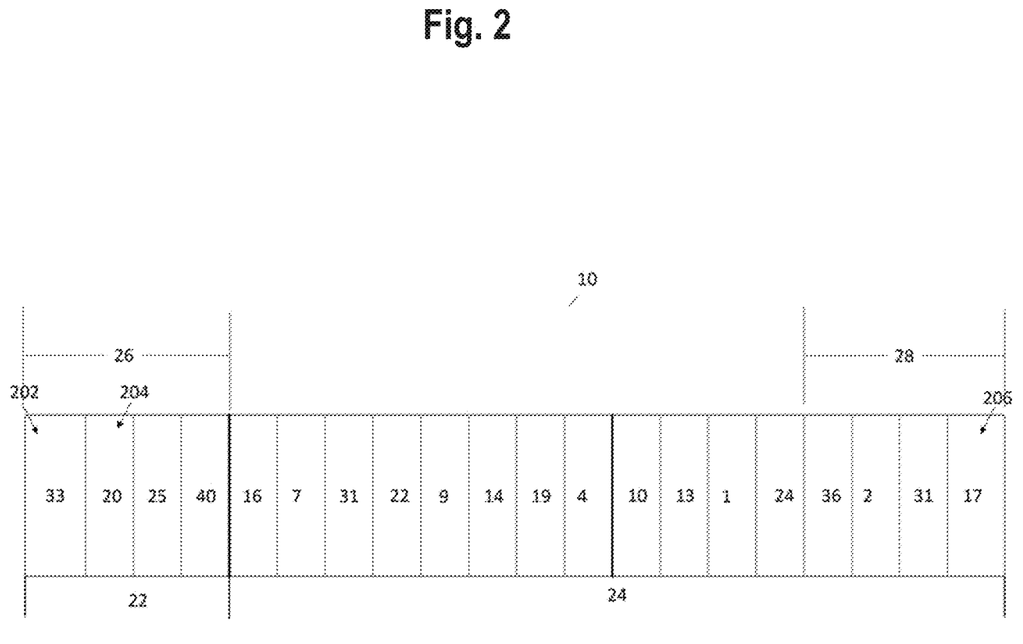
FIG. 2 is a diagram depicting a linearized vectorized d-heap according to an embodiment of the present invention.

In one embodiment, d-heap 10 is configured to be stored in an array of slots in a contiguous memory where each slot is an element of the array. The array is configured to allocate additional memory for adding and storing key values, and each element of the array may correspond to one respective slot of the nodes of d-heap 10. FIG. 2 is a diagram that depicts d-heap 10 vectorized in which each key value in the D slots of the root node at root level 12 is stored contiguously in contiguous space 22 and each key value in the D slots of non-root level 14 are stored contiguously in contiguous space 24 immediately after storing the key values of the root node in contiguous space 22; thus, vectorizing d-heap 10 wherein the four key values within the first four slots of the root node in root level 12 fill beginning-most array of slots 26 and the key values within the D slots of the nodes of non-root level 14 fill remaining slots 28. In an embodiment, key values of parent nodes are stored contiguously in a first set of slot elements of an array of memory followed by contiguously storing key values of child nodes in a second set of slot elements of the array of memory. This process of filling slots of the array continues until the key values of each node of d-heap 10 fills a slot of the array; thus, forming a beginning-most side and an end-most side. For example, if a slot of the root node contains the key value of 20 then the key value 20is stored within beginning-most slot 202 of contiguous space 22 while the key field value of end-most child node 18 of non-root level 14 is stored within end-most slot 206 of contiguous space 24.

Payload Implementation

According to an embodiment, a heap is stored in conjunction with a payload array. The payload array is aligned with the array of the heap ("heap array"). That is, the first slot of payload array stores a payload for the first slot in the heap array, the second slot of the payload array stores a payload for the second slot in the heap array, and so forth. According to an embodiment, a slot in a payload array stores a pointer to a memory address storing payload data.

The payload array is maintained so that alignment between the payload array and heap array are maintained. Thus, when a key value is swapped between a parent slot and child slot in a child node of the parent slot, in the payload array, the respective slot of the parent slot is swapped with the respective slot in the child slot.

Pointer Implementation

In an embodiment, a d-heap is represented using a pointer-based representation. Each node comprises D slots for key values ("key value slots") and D slots for pointers ("pointer slots"). The key value slots and pointer slots are stored contiguously within memory address space, with the key value slots being stored contiguously within an address space of memory so that the key value slots may be loaded into memory as a cache line or contiguous portion of a cache line.

Each key value slot corresponds to a respective pointer slot stored at an offset based on the address of the key value slot. The pointer stored in the respective pointer slot points to a child node.

A pop operation for a pointer-based representation comprises at least the following. For a given key value stored in a parent slot in a parent node, the child node is traversed to by using the pointer stored at the respective pointer slot in the parent node of the parent slot. The key values stored in the key value slots of the child node are loaded into the SIMD register. A SIMD operation is performed to generate a minimum key value among the key values the index thereof. The minimum key value is then compared to the give key value in parent slot. If the minimum key value is less than the key value in the parent slot, the key values are swapped between child slot identified by the index and parent slot, and so forth.

Process Overview

Figure 3A:
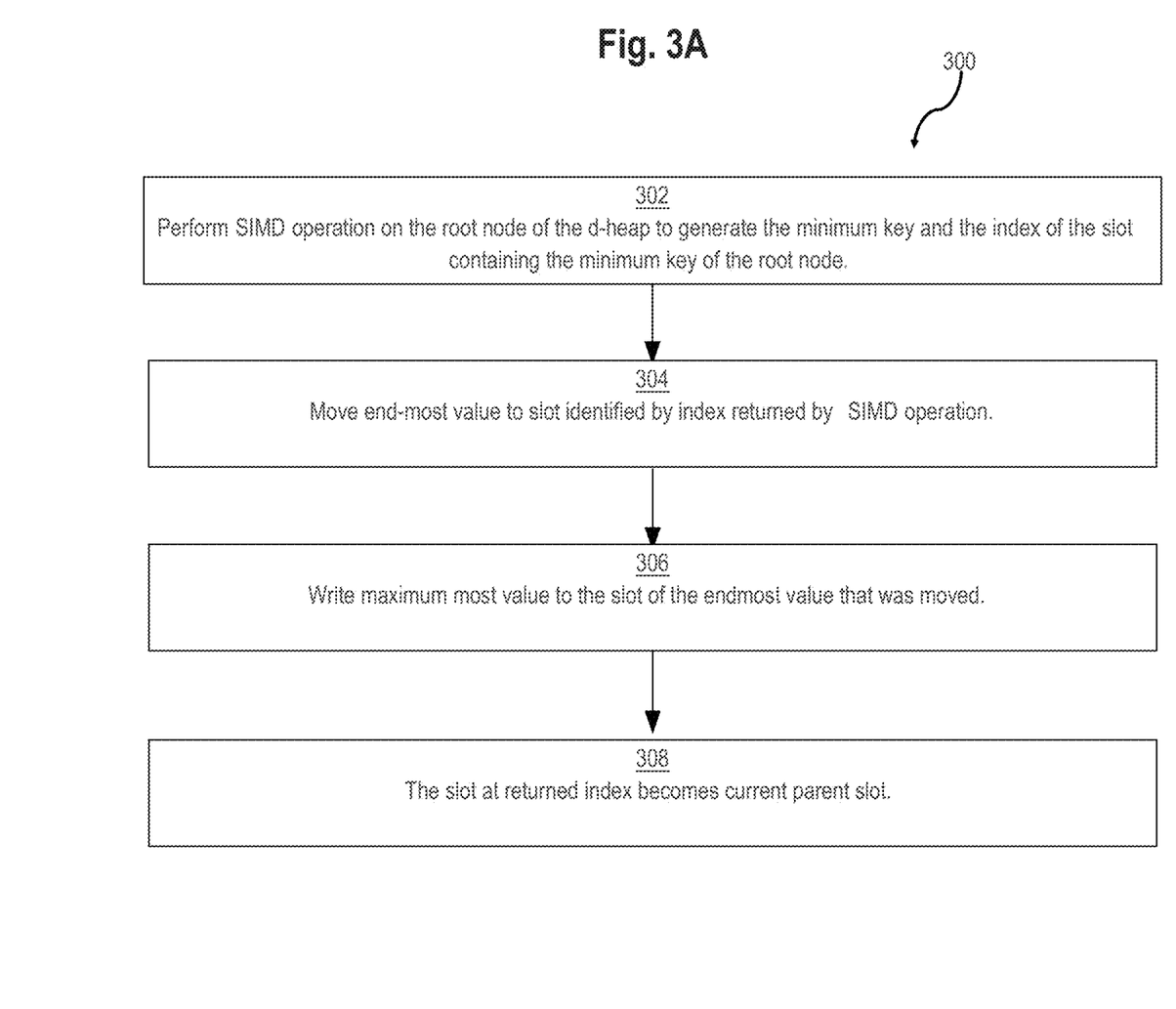
Figure 3B:
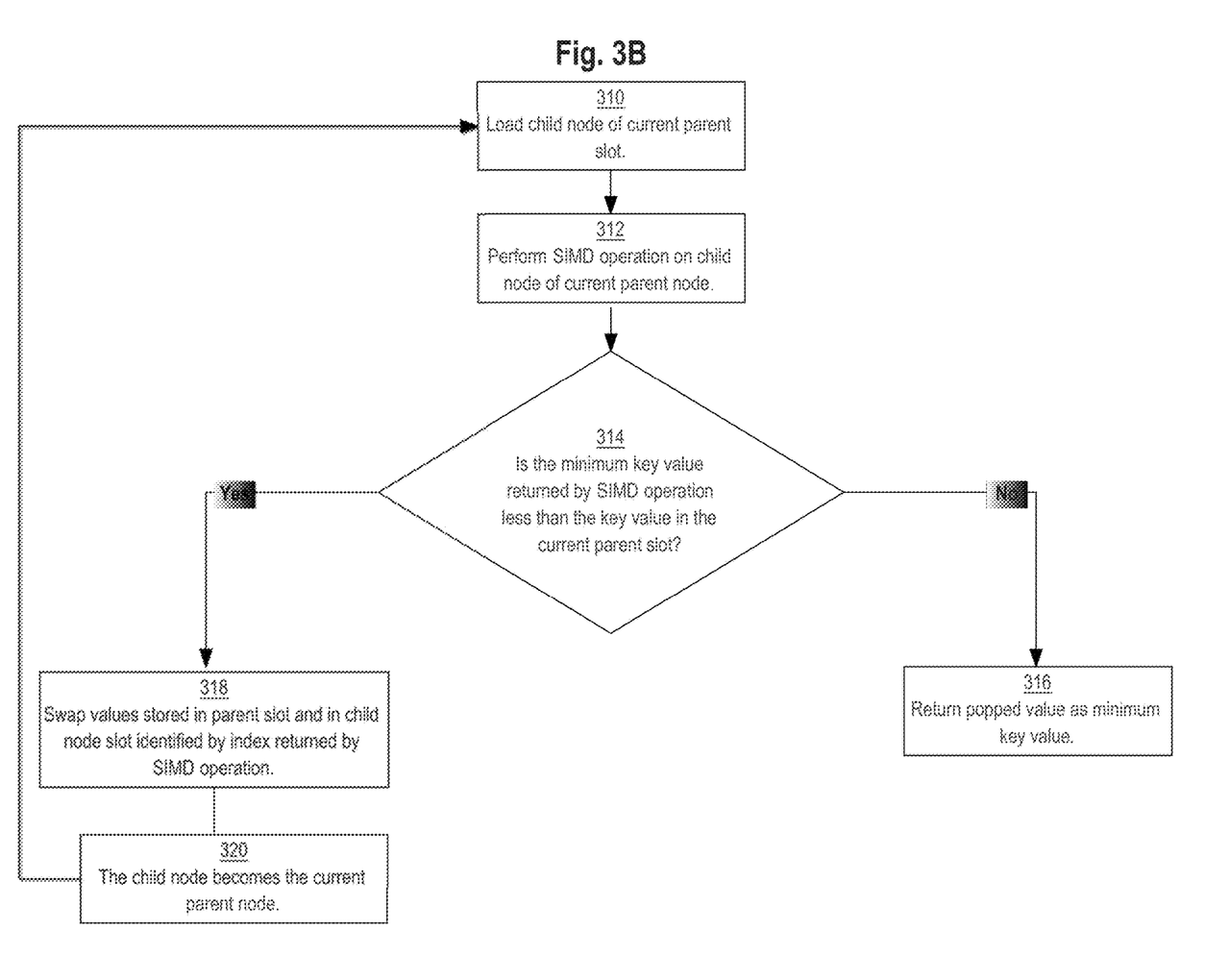

FIG. 3A-B is a flow diagram that depicts process 300 for using horizontal aggregation SIMD instructions across the pop operation of d-heap 10. Process 300 may be performed in any modern x86 processors containing Streaming SIMD Extensions (SSE). The x86 processor architecture allows the instructions to operate on an independent register set including registers, which contain eight 16-bit values being compared. A determination is made during process 300 pertaining to whether d-heap 10 has enough memory to accommodate new pushed/inserted items, if there is not enough memory then the size of d-heap 10 is doubled and the additionally allocated memory is initialized to the maximum value of an unsigned 16-bit value. For example, if the current node contains only one key value and one or more empty slots, then the empty slots are initialized to the maximum value so PHMINPOSUW will always return the first key value in the current node.

In one embodiment, a new item is pushed/inserted into the end-most heap level of d-heap 10 stored into the end-most slot of the array, and a counter containing the size of d-heap is increased by one. The inserted item traverses up the heap levels of d-heap 10 until the inserted item reaches root level 12 or the inserted item's parent key value is less than the item.

At block 302, the content of the root node, such as the key values within the root node in root level 12 of d-heap 10, is read from a first register and loaded into a second register. A horizontal SIMD instruction is performed, which vectorizes the key values of the root node and generates a minimum key value and an index of the root node that indicates the location of the minimum key value. This minimum key value can be returned by performing a SIMD operation on the root node to generate the minimum key value and returning it as the minimum key value stored in d-heap 10. The PHMINPOSUW instruction always returns the first key value that is smaller than all of the other key values of the current node. The PHMINPOSUW instruction may also be used to perform a top operation in which the key values of root level 12 are loaded into the second register, a SIMD operation is performed on the root node, and the first key value of root level 12 in the highest heap level is returned.

In one embodiment, a horizontal SIMD instruction is performed on the root node in the highest heap level to generate a maximum key value and an index of the root node that indicates the location of the maximum key value, which is returned as the maximum key value stored in d-heap 10.

At block 304, the key value within the end-most slot of child node 18 within non-root level 14, which is represented in end-most slot 206 of contiguous space 24, is copied into beginning-most slot 202 of contiguous space 22 identified by the first index.

At block 306, the key value within the end-most slot of child node 18, which is represented in end-most slot 206 of contiguous space 24, is overwritten with the maximum most key value, which is an unsigned 16-bit value. In the case where d-heap 10 only contains one node then the key value within the end-most slot of root level 12 is the item popped off d-heap 10.

At block 308, the node containing the slot of the returned index traversed down to for a determination as to whether the minimum key value of the current node is larger than any of the key values contained in the child nodes of the current node.

At block 310 after the swap of the minimum keys, a loop is entered into and the content of the child node of the current node containing the parent slot is loaded. At 312, a SIMD operation is performed on the child node of the current node containing the parent slot to generate a minimum key and an index indicating where the minimum key is located in the child node of the current parent node. At 314, a determination is made as to whether the minimum key value returned by the SIMD operation is less than the key value in the current parent slot. If not, then block 316 occurs where the key value popped off of d-heap 10 is returned as the minimum key value. If so, then block 318 occurs where the minimum key value stored in the node containing the parent slot and the minimum key value of the child node of the current node containing the parent slot are swapped, and block 320 occurs where the child node of the current node becomes the current parent node looping back to block 316 where the child node of the current parent node is loaded. The loop continues until there are no further child nodes of the non-root levels to traverse down to or there is no key value in the current slot that is larger than the key values of its associated child node.

Signed Integer Values and Maximum Implementation

In the instance where there are no horizontal aggregation SIMD instructions for signed data types available, unsigned comparison instructions are supported by switching the sign bit to its complement whenever a key value is inserted (push operation performed on the d-heap) into a signed integer d-heap and switching the sign bit back whenever it is retrieved from the d-heap (pop operation performed on the d-heap). Functions derived from an unsigned integer d-heap may be used or reused to obtain implementations of a signed integer d-heap. For example, insert and retrieve operations of the unsigned integer d-heap may be implemented for a signed integer d-heap by switching the sign bit for its respective functions, and switching the sign bit back whenever necessary.

Similar methods may be used to accomplish tasks such as reversing the order and returning of key values, and implementing a maximum d-heap. In order to implement a maximum d-heap the complement of the sign bit of a key value is loaded whenever a key value is inserted into the d-heap and the complement of the complement is returned whenever the key value is retrieved from the d-heap.

In one embodiment, compare instructions inverse to the horizontal SIMD instruction used on the minimum d-heap are performed, which vectorizes the key values of the root node and generates a maximum key value and an index of the root node that indicates the location of the maximum key value. This maximum key value can be returned by performing a SIMD operation on the root node to generate the maximum key value and returning it as the maximum key value stored in d-heap 10. The PHMAXPOSUW instruction always returns the first key value that is larger than all of the other key values of the current node.

D-Heap Memory Management

Due to the requirement of sufficient contiguous memory allocated to accommodate all items of the heap, memory is allocated either once during the creation of the heap, or dynamically during the lifetime of the heap. Therefore, according to an embodiment of the present invention, methods are provided that minimize the number of reallocations during the lifetime of the heap. Herein, an exponential growth allocation strategy is presented in which the heap allocates memory for 8 items (a single 128-bit vector), and when the heap requires more memory the size of the heap is doubled.

According to an embodiment of the present invention, a vectorized d-heap's memory is managed by storing a first counter containing the size/number of items within the heap and a secondary counter accounting for how many items can be stored in its currently allocated memory area. If the first counter exceeds the secondary counter, then the secondary counter and the heap's memory is doubled. In contrast, if the first counter reaches half the value of the secondary counter then the memory of the heap shrinks.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
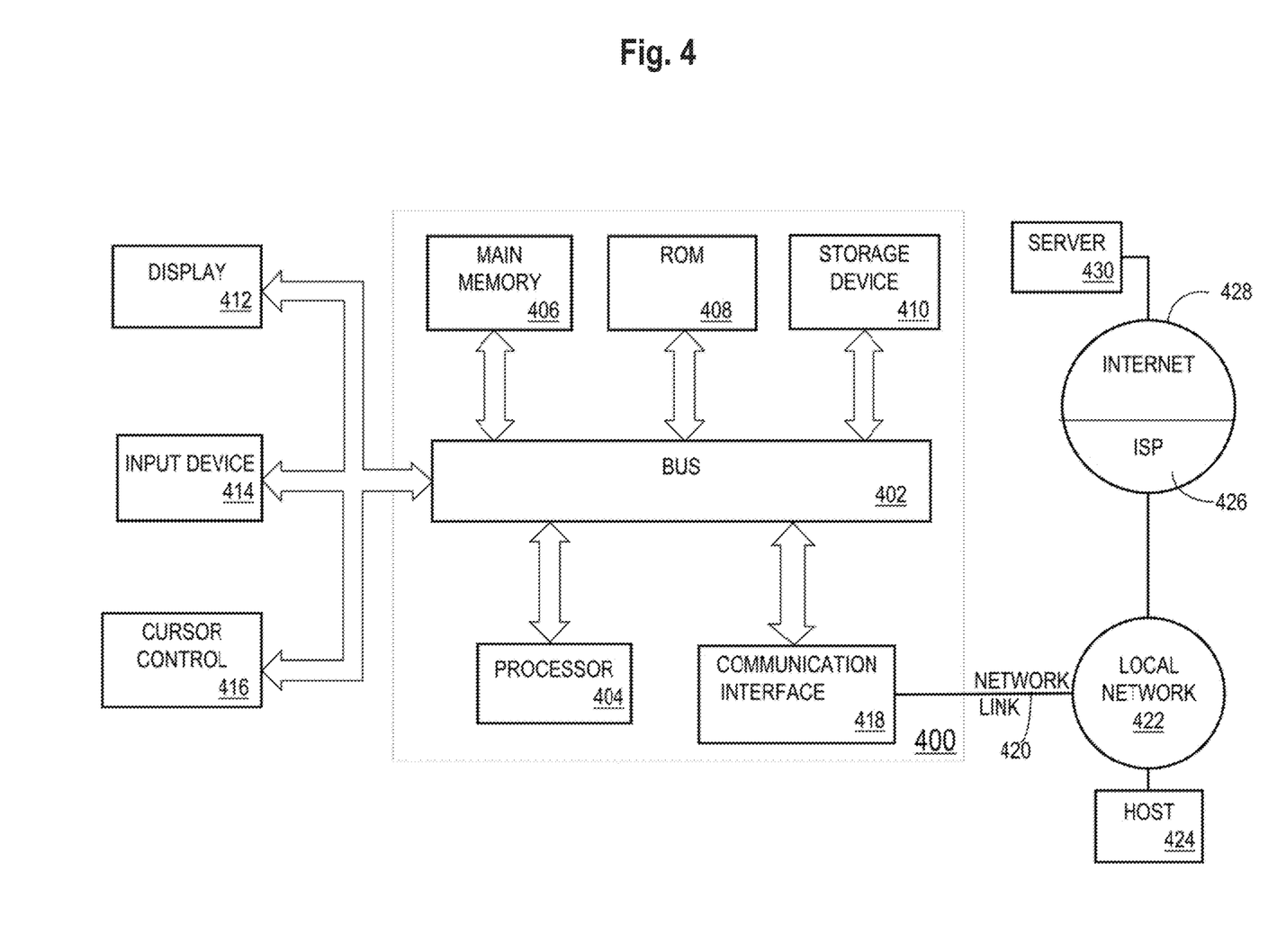
FIG. 4 is a diagram depicting a computer system that may be used in an embodiment of the present invention.

For example, FIG. 4 is a block diagram that illustrates a computer system 400 upon which an embodiment of the disclosure may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
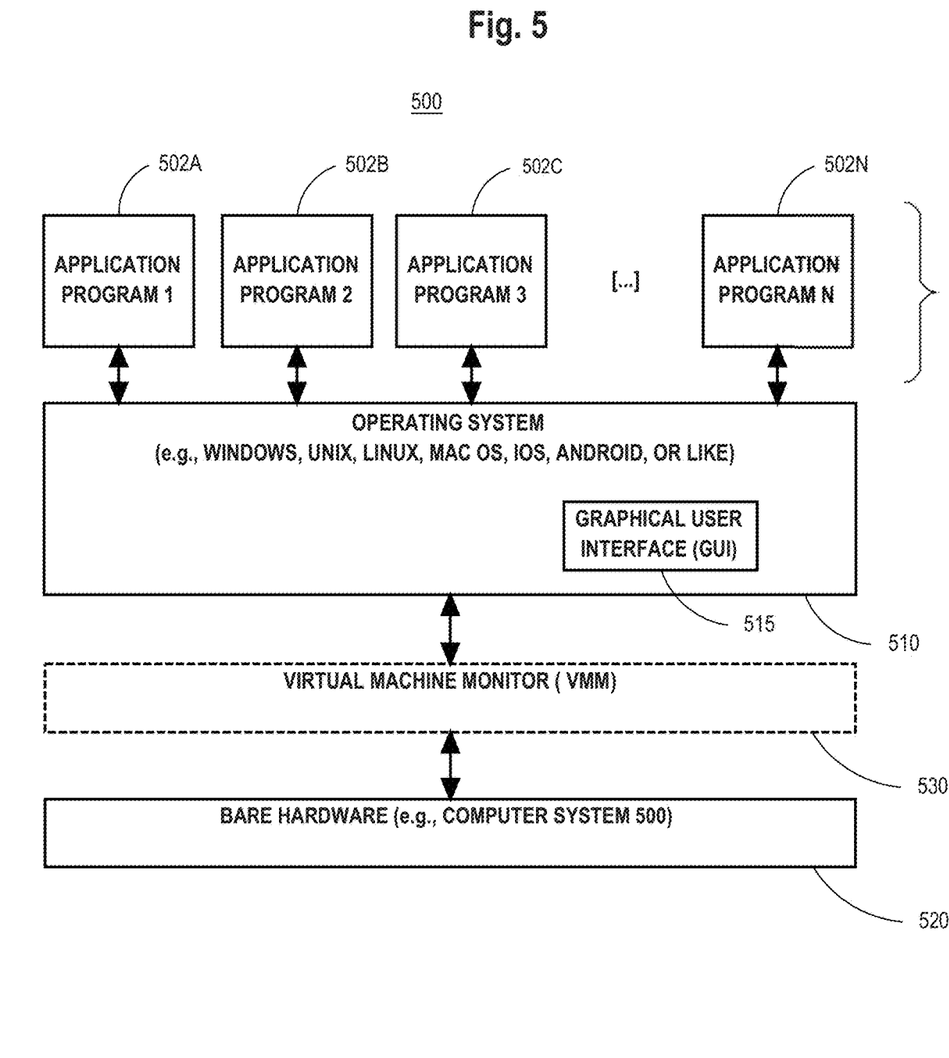
FIG. 5 is a diagram depicting a software system upon which an embodiment of the invention may be implemented.

FIG. 5 is a block diagram of a software system 500 that may be employed for controlling the operation of computer system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 400. The applications or other software intended for use on system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of system 500. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

What is claimed is:

1. A method comprising:
performing a pop operation on a heap stored in a memory;
wherein said heap comprises a plurality of nodes;
wherein each node of said plurality of nodes comprises D slots, D being a whole number greater than one, wherein each slot of said D slots stores of a key value of D key values, wherein the D slots of said each node are stored contiguously within a memory address space of said memory;
wherein said plurality of nodes includes a root node and a plurality of parent nodes,
said root node having D child nodes of said plurality of nodes, wherein each child node of said D child nodes of said root node is a child of a respective parent slot in said root node, wherein each key value stored in a slot of said each child node is not less than a key value stored in said respective parent slot in said root node;
each parent node of said plurality of nodes having D child nodes, wherein each child node of said D child nodes of said each parent node is a child of a respective parent slot in said each parent node, wherein each key value stored in a slot of said each child node is not less than a key value stored in said respective parent slot in said each parent node;
wherein performing a pop operation on a heap includes:
performing a SIMD (Single Instruction, Multiple Data) operation on said root node to generate a first minimum key value and a first index of a first slot in the root node that holds said first minimum key value;
copying a key value in an end-most slot in the heap into said first slot;
wherein said first slot is a parent slot of a first child node;
performing a SIMD operation on said first child node to generate a second minimum key value and a second index of a second slot in said first child node that contains said second minimum key value;
determining that said second minimum key value is less than said first minimum key value stored in said first slot; and
in response to determining that said second minimum key value is less than said first minimum key value, swapping the first minimum key value and the second minimum key between the first slot and the second slot.

2. The method of claim 1, further including:
performing a SIMD operation on a second child node of said first child node to generate a third minimum key value and a third index of a third slot in said second child node of the second child node that contains said third minimum key value;
determining whether said third minimum key value is less than said second minimum key value stored in said second slot; and
when said third minimum key value is less than said second minimum key value stored in said second slot, swapping the second minimum key value and the third minimum key value between the second slot and the third slot.

3. The method of claim 1, further including:
performing a particular operation that returns a minimum key value stored in said heap by at least performing:
performing a SIMD operation on said root node to generate a particular minimum key value; and
returning said particular minimum key value as said minimum key value stored in said heap.

4. The method of claim 1, further including:
performing a particular operation that returns a maximum key value stored in said heap by at least:
performing a SIMD operation on said root node to generate a particular minimum key value;
generating a compliment of said particular minimum key value; and returning said compliment as said maximum key value stored in said heap.

5. The method of claim 1, further including:
performing a particular operation that returns a minimum key value stored in said heap by at least:
performing a SIMD operation on said root node to generate a particular minimum key value;
generating a particular value by changing a sign of said particular minimum key value; and
returning said particular value as said minimum key value stored in said heap.

6. The method of claim 1, further including:
wherein said heap is stored in a first array,
wherein said first array comprises a plurality of heap levels, wherein a first heap level of said plurality of heap levels stores said root node, wherein each particular heap level of said plurality of heap levels after said first heap level stores contiguously with an address space of said memory all child nodes of the heap level of said plurality of heap level previous to said each particular heap level.

7. The method of claim 6, wherein
each element of said first array corresponds to one respective slot in said plurality of nodes;
each payload element of a payload array corresponds to one element of said first array and to the one respective slot in said plurality of nodes that corresponds to said one element of said first array; and
wherein the method further includes, in response to determining that said second
minimum key value is less than said first minimum key value, swapping the values between a pair of elements in said payload array that correspond to said first slot and said second slot respectively.

8. The method of claim 6, further including:
allocating additional memory for said first array to add another key value to said heap and store said another key value in said additional memory.

9. The method of claim 1, wherein:
each pointer of a set of pointers points to a memory address storing a respective node of said plurality of nodes; and
wherein prior to performing a SIMD operation on said root node, the respective pointer of said set of pointers points to said root node to load said root node into a register used by said SIMD operation on said root node.

10. The method of claim 1, further including:
performing a particular operation that returns a maximum key value stored in said heap by at least:
performing a SIMD operation on said root node to generate a first maximum key value and a first index of a first slot in the root node that holds said first maximum key value; and
returning said first maximum key value as said maximum key value stored in said heap.

11. One or more non-transitory storage media storing sequence of instructions, which when executed by one or more processors, cause:
performing a pop operation on a heap stored in a memory;
wherein said heap comprises a plurality of nodes;
wherein each node of said plurality of nodes comprises D slots, D being a whole number greater than one, wherein each slot of said D slots stores of a key value of D key values, wherein the D slots of said each node are stored contiguously within a memory address space of said memory;
wherein said plurality of nodes includes a root node and a plurality of parent nodes,
said root node having D child nodes of said plurality of nodes, wherein each child node of said D child nodes of said root node is a child of a respective parent slot in said root node, wherein each key value stored in a slot of said each child node is not less than a key value stored in said respective parent slot in said root node;
each parent node of said plurality of nodes having D child nodes, wherenin each child node of said D child nodes of said each parent node is a child of a respective parent slot in said each parent node, wherein each key value stored in a slot of each child node is not less than a key value stored in said respective parent slot in each parent node;
wherein performing a pop operation on a heap includes:
performing a SIMD (Single Instruction, Multiple Data) operation on said root node to generate a first minimum key value and a first index of a first slot in the root node that holds said first minimum key value;
copying a key value in an end-most slot in the heap into said first slot;
wherein said first slot is a parent slot of a first child node;
performing a SIMD operation on said first child node to generate a second minimum key value and a second index of a second slot in said first child node that contains said second minimum key value;
determining that said second minimum key value is less than said first minimum key value stored in said first slot; and
in response to determining that said second minimum key value is less than first minimum key value, swapping the first minimum key value and the second minimum key value between the first slot and the second slot.

12. The one or more non-transitory storage media of claim 11,
wherein the sequences of instructions include instructions that, when executed by one or more processors, further cause:
performing a SIMD operation on a second child node of said first child node to generate a third minimum key value and a third index of a third slot in said second child node of the second child node that contains said third minimum key value;
determining whether said third minimum key value is less than said second minimum key value stored in said second slot; and
when said third minimum key value is less than said second minimum key value stored in said second slot, swapping the second minimum key value and the third minimum key value between the second slot and the third slot.

13. The one or more non-transitory storage media of claim 11, wherein the sequences of instructions include instructions that, when executed by one or more processors, further cause:
performing a particular operation that returns a minimum key value stored in said heap by at least performing:
performing a SIMD operation on said root node to generate a particular minimum key value; and
returning said particular minimum key value as said minimum key value stored in said heap.

14. The one or more non-transitory storage media of claim 11, wherein the sequences of instructions include instructions that, when executed by one or more processors, further cause:

performing a particular operation that returns a maximum key value stored in said heap by at least:
 performing a SIMD operation on said root node to generate a particular minimum key value;
 generating a compliment of said particular minimum key value; and
 returning said compliment as said maximum key value stored in said heap.

15. The one or more non-transitory storage media of claim 11, wherein the sequences of instructions include instructions that, when executed by one or more processors, further cause:
 performing a particular operation that returns a minimum key value stored in said heap by at least:
  performing a SIMD operation on said root node to generate a particular minimum key value;
  generating a particular value by changing a sign of said particular minimum key value; and
  returning said particular value as said minimum key value stored in said heap.

16. The one or more non-transitory storage media of claim 15, wherein said heap is stored in
 a first array, wherein said first array comprises a plurality of heap levels,
 wherein a first heap level of said plurality of heap levels stores said root node,
 wherein each particular heap level of said plurality of heap levels after said first heap level stores contiguously with an address space of said memory all child nodes of the heap level of said plurality of heap level previous to said each particular heap level.

17. The one or more non-transitory storage media of claim 16, wherein each element of said first array corresponds to one respective slot in said plurality of nodes;
 each payload element of a payload array corresponds to one element of said first array and to the one respective slot in said plurality of nodes that corresponds to said one element of said first array; and
 wherein the sequences of instructions include instructions that, when executed by one or more processors, further cause; in response to determining that said second minimum key value is less than said first minimum key value, swapping the values between a pair of elements in said payload array that correspond to said first slot and said second slot respectively.

18. The one or more non-transitory storage media of claim 16, wherein the sequences of instructions include instructions that, when executed by one or more processors, further cause:
 allocating additional memory for said first array to add a key value to said heap and store said key value in said additional memory.

19. The one or more non-transitory storage media of claim 11, wherein
 each pointer of a set of pointers points to a memory address storing a respective node of said plurality of nodes; and
 wherein prior to performing a SIMD operation on said root node, the respective pointer of said set of pointers points to said root node to load said root node into a register used by said SIMD operation on said root node.

20. The one or more non-transitory storage media of claim 11, wherein the sequences of instructions include instructions that, when executed by one or more processors, further cause:
 performing a particular operation that returns a maximum key value stored in said heap by at least:
  performing a SIMD operation on said root node to generate a first maximum key value and a first index of a first slot in the root node that holds said first maximum key value; and
  returning said first maximum key value as said maximum key value stored in said heap.

* * * * *

UNITED STATES PATENT AND TRADEMARK OFFICE
CERTIFICATE OF CORRECTION

PATENT NO. : 11,169,804 B2  
APPLICATION NO. : 16/139226  
DATED : November 9, 2021  
INVENTOR(S) : Schlegel et al.

Page 1 of 2

It is certified that error appears in the above-identified patent and that said Letters Patent is hereby corrected as shown below:

On the Title Page

On page 2, Column 1, Item (56) under Other Publications, Line 8, delete "AddisonWesley" and insert -- Addison Wesley --, therefor.

On page 2, Column 1, Item (56) under Other Publications, Line 25, delete "datged" and insert -- dated --, therefor.

On page 2, Column 2, Item (56) under Other Publications, Line 59, delete "al.." and insert -- al., --, therefor.

On page 3, Column 1, Item (56) under Other Publications, Line 2, delete "Yorkm" and insert -- York --, therefor.

On page 3, Column 1, Item (56) under Other Publications, Line 6, delete "Paralll" and insert -- Parallel --, therefor.

On page 3, Column 1, Item (56) under Other Publications, Line 13, delete "Paralleslism" and insert -- Parallelism --, therefor.

In the Drawings

On sheet 3 of 6, in FIG. 3A, under Reference Numeral 306, Line 1, delete "endmost" and insert -- end-most --, therefor.

In the Specification

In Column 1, Line 64, delete "FIG." and insert -- FIGS. --, therefor.

In Column 2, Line 25, delete "include" and insert -- includes --, therefor.

Signed and Sealed this  
First Day of March, 2022

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 11,169,804 B2

In Column 5, Line 31, delete "20is" and insert -- 20 is --, therefor.

In Column 6, Line 18, delete "FIG." and insert -- FIGS. --, therefor.

In Column 8, Line 4, delete "PHMAXPOSUW" and insert -- PHMINPOSUW --, therefor.

In the Claims

In Column 12, Line 39, in Claim 1, delete "key" and insert -- key value --, therefor.

In Column 14, Line 11, in Claim 11, delete "wherenin" and insert -- wherein --, therefor.

In Column 14, Line 14, in Claim 11, delete "each" and insert -- said each --, therefor.

In Column 14, Line 16, in Claim 11, delete "each" and insert -- said each --, therefor.

In Column 14, Line 33, in Claim 11, delete "first" and insert -- said first --, therefor.

In Column 16, Line 3, in Claim 17, delete "cause;" and insert -- cause: --, therefor.